US006724431B1

(12) United States Patent
Aton

(10) Patent No.: US 6,724,431 B1
(45) Date of Patent: Apr. 20, 2004

(54) PROGRAM NETWORK SPECIFIC INFORMATION FOR TV OR RADIO

(75) Inventor: Thomas J. Aton, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1,671 days.

(21) Appl. No.: 08/250,631

(22) Filed: May 27, 1994

Related U.S. Application Data

(63) Continuation of application No. 07/678,570, filed on Mar. 28, 1991, now abandoned.

(51) Int. Cl.[7] .......................... H04N 11/00; H04N 7/00
(52) U.S. Cl. ...................................... 348/461; 348/467
(58) Field of Search ........................... 348/6, 476, 473, 348/732, 906, 461, 463, 465, 467, 468, 469, 563, 569; 455/156.1

(56) References Cited

U.S. PATENT DOCUMENTS

| 4,218,698 A | * | 8/1980 | Bart ........................... 358/183 |
| 4,392,246 A | * | 7/1983 | Niioka et al. ............ 455/156.1 |
| 4,425,581 A | * | 1/1984 | Schweppe ................... 348/140 |
| 4,541,013 A | * | 9/1985 | Alpert ......................... 358/142 |
| 4,779,138 A | * | 10/1988 | Nomura et al. ............. 358/142 |
| 4,890,319 A | * | 12/1989 | Seth-Smith ..................... 348/6 |
| 4,890,321 A | * | 12/1989 | Seth-Smith .................. 348/476 |
| 4,953,022 A | * | 8/1990 | Bugg .......................... 358/146 |
| 4,963,968 A | * | 10/1990 | Bugg et al. ................. 358/142 |
| 5,045,948 A | * | 9/1991 | Streck et al. ............... 358/142 |
| 5,056,139 A |   | 10/1991 | Littlefield ..................... 380/20 |
| 5,070,404 A | * | 12/1991 | Bullock et al. ............. 358/142 |
| 5,450,135 A | * | 9/1995 | Schick ......................... 348/732 |
| 5,659,368 A | * | 8/1997 | Landis ......................... 348/467 |

FOREIGN PATENT DOCUMENTS

| JP | 0111184 | * | 7/1982 | ................. 358/147 |
| JP | 0209278 | * | 12/1983 | ................. 358/142 |
| JP | 0154886 | * | 9/1984 | ................. 358/153 |
| JP | 0103888 | * | 6/1985 | ................. 358/147 |

OTHER PUBLICATIONS

Television Electronice: Theory and Servicing, Kiver et al, pp77–81, 1983.*

* cited by examiner

Primary Examiner—Minsun Oh Harvey
(74) Attorney, Agent, or Firm—Ronald O. Neerings; Wade James Brady, III; Frederick J. Telecky, Jr.

(57) ABSTRACT

A communication system is desccribed which comprises a transmitter which transmits a standard broadcast format with an associated text string and a receiver for the reception and processing of the standard broadcast format and associated text string. The associated text string has close caption text in addition to other program or station specific text. The other program or station specific text is separated from the associated text string, decoded, processed and stored in function specific memories. When one changes a channel, or presses a button on a remote or has programmed in specific information requested, the program or station specific text is displayed. This text may be displayed on the televison screen with the picture, or it may be displayed on a separate display.

43 Claims, 1 Drawing Sheet

PROGRAM NETWORK SPECIFIC INFORMATION FOR TV OR RADIO

This application is a Continuation of application Ser. No. 07/678,570 filed Mar. 28, 1991.

FIELD OF THE INVENTION

The present invention relates in general to broadcast communications and in particular to apparatus and methods for increasing the information available on a certain broadcast at a certain time.

BACKGROUND OF THE INVENTION

In its early days, television consisted of a few major stations with one educational station thrown in for good measure. When one was out of town on business or visiting a relative, finding the desired program was not difficult due to the limited selection available. The expansion of the cable television industry has vastly changed the amount and the quality of the television programming available to the viewing public such that finding the desired program may be time consuming and difficult. Finding what station is broadcast on what channel is the first stumbling block. Unless one is familiar with all the shows broadcast on a particular channel or is willing to watch a channel until it takes a station break, this task could prove formidable. To only make things more frustrating, every time one changes a channel, this task must be repeated.

In a somewhat similar manner, sports fans are oftentimes frustrated because the broadcast station does not show the score of the sporting event often enough. Sports fans may be flipping through the sporting events trying to get an update on all the scores, only to be disappointed by the seemingly purposely sluggish manner in which the stations post the scores. In addition, money is oftentimes wagered upon sports scores, which increases the allure of a constant score update system.

Most televisions only display the channel number of the selected channel. Some also display the time. Recently, several televisions have come on the market which allow the user to program in up to four characters of information describing the channel. This information, such as station call letters or the network, is printed on the screen with the channel number when a channel is selected. However, a special television is necessary to provide this function.

Thus, a need has arisen for a way of harnessing the huge array of public programming into a stand-alone user friendly entertainment system. Such a system would provide network and/or show title information at a minimum. Such a system should be inexpensive and be capable of being integrated into present communications transmitters and receivers.

SUMMARY OF THE INVENTION

Some televisions are already equipped to strip and display text or other icon information, i.e. Close Captioning for the Hearing Impaired. As used herein, icons include any text strings or other symbolic items. The present invention improves on this idea, wherein some descriptors, in the form of text for a title or numerals for a sport score, of the displayed show be broadcast with the show, and then displayed either on the television display or on a separate display. One simple method of broadcasting these descriptors could be to imbed the descriptors in the Close Caption text and mark it with special characters. Then, the close captioning equipment could be used to strip the descriptors for display on all receivers. Receivers for the hearing impaired could display both. In this manner, program or station specific information could be displayed on the same screen as the program being broadcast or on a separate display.

DETAILED DESCRIPTION OF PREFERRED EMBODIMENTS

Figure 1:
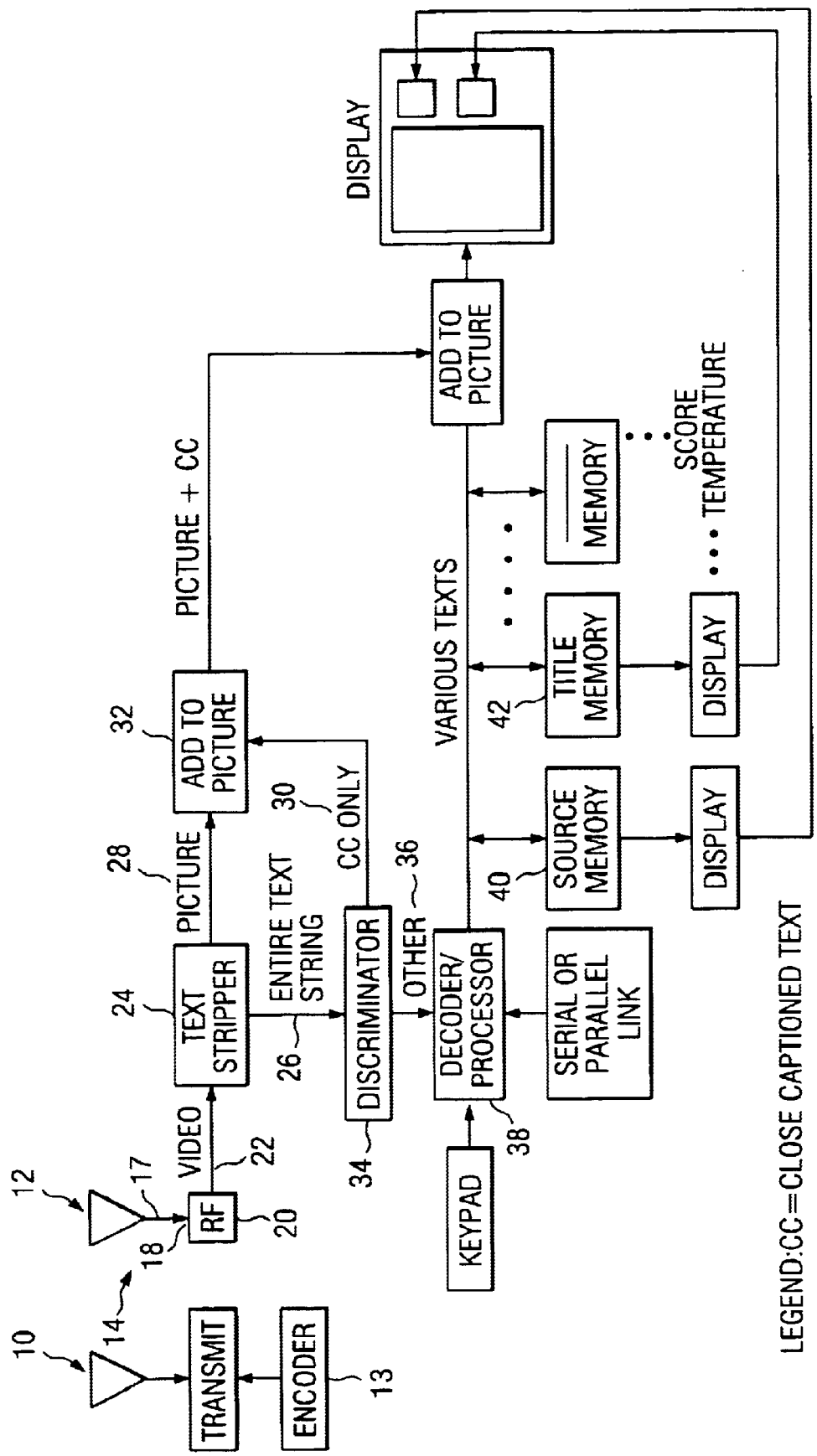
FIG. 1 is a functional block diagram of a first embodiment of this inventions communications system.

A system which provides not only the communication signal but also some additional information about that signal or the source of that signal will be described first, followed by a description of the operation of such a system.

Referring first to FIG. 1, a transmitter is shown generally at 10. Transmitter 10, and a receiver 12 operate cooperatively to convey information from the operator of transmitter 10 to the user of receiver 12. In a preferred embodiment, transmitter 10 is a standard broadcast television station or the distributing point of a cable television network. Receiver 12 in the preferred embodiment is a home television set. Television transmission and reception techniques are well known generally in the art, and therefore the specifics will not be described herein.

Transmitter 10 transmits the standard communications signals, associated with the selected communications format. This standard communications signal may comprise an associated signal carrying some network or program specific information. In the standard case of television, transmitter 10 would output the standard signals associated with the television broadcast format, and an associated signal carrying some network or program specific information. The associated signal could be imbedded in closed-caption text and marked with special characters to be stripped from and displayed separately from the standard closed-captioning text. Further, it should be noted that the associated signal does not need to be transmitted continuously with the communications signal, but may be periodically broadcast such as in discrete increments of time. Or, the user of the television set may determine when this network or program specific information is to be displayed by pushing a button on the remote control, similar to the button currently available on some remote controls which displays the time. Another configuration would be for the receiver to turn on automatically ion the middle of the night for about a minute to receive the next days network or program specific information, which would be broadcast by the broadcasting station.

Communication signal 14 is provided to an input 18 of radio frequency (RF) section 20 of receiver 12. In a standard airborne broadcast system, communications signal 14 would be provided to input 18 via antenna 17. In a cable transmission system, communications signal 14 would be provided to input 18 via a direct cable connection (not shown). In a fiber-optics transmission system, communications signal 14 would be provided to input 18 via a direct fiber-optic cable (not shown).

Radio frequency section 20 may be any one of a number of systems known in the art. In general, RF section 20 would contain amplifiers and filters necessary to provide receiver 12 with a sufficiently low noise figure and restricted band width such that communications signal 14 can be discerned from extraneous signals and noise also appearing at input 18.

An output 22 passes an amplified communications signal 14 to an input of an intermediate frequency section where the frequency of the communications signal 14 is converted down to a frequency at which the signals can be more easily processed, then processed to produce the end products of video and audio. The video portion of the communications signal 14 then enters a "text stripper" 24 which strips the entire icon string 26 and the picture 28 from the video signal. The picture 28 is then sent to processor 32. The entire icon string 26 is separated into the close caption text 30 and the remaining icons 36 at the "descriminator" 34. The close caption text 30 is then sent back to the processor 32 which will add the close caption text to the picture in the standard manner.

The present invention operates in a manner somewhat similar to the addition of close caption text to a T.V. picture. Referring again to FIG. 1, the remaining icons 36, leaving discriminator 34, go to a "decoder/processor" 38. Here the additional information is decoded from all remaining icons, stored in a function specific memory, and displayed either on the television screen or to another display. The additional information is stored such that the keypad of a remote control or a serial or parallel link is suitable for requesting a specific type of information to be displayed. The decoder/processor may be designed such that when a channel is changed, the specified additional information is instantaneously displayed. The memories may be RAM, ROM, EPROM, EEPROM or others and may contain the broadcast station source, the title of the program being broadcast or the score of the game being broadcast to name a few.

The prior art television function has been described which allows a viewer to program in up to four characters describing the channel to be displayed with the channel number upon the channel being changed. If a viewer was to buy a new T.V., programming in 60 cable T.V. stations would prove to be a formidable task. A second embodiment of the invention is to have a serial or parallel link installed in the television that would allow the television microprocessor talk to an external computer. An external computer, at an appliance store, could have a stored data base for all the channels of all the cable systems within, for example, 100 miles of the store. Then, when a customer purchases a T.V., he could request that the store "download" a particular area, and all of the channels received in that area could be stored in the memories within the television.

It will be appreciated that applications for this concept are numerous. In radio, for example, the station call letters could be stored in memory to be displayed dependent upon a frequency counter recognizing a change in frequency.

A few preferred embodiments have been described in detail hereinabove. It is to be understood that the scope of the invention also comprehends embodiments different from those described, yet within the scope of the claims.

For example, color display devices can be raster-scanned cathode ray tubes or other raster-scanned devices; devices that are not raster-scanned and have parallel line or frame drives; color printers, film formatters, or other hard copy displays; liquid crystal, plasma, holographic, deformable micromirror, or other displays of non-CRT technology; or three-dimensional or other devices using nonplanar image formation technologies.

The term "microcomputer" and "microprocessor" as used herein are synonyms. The phrase "processing circuitry" comprehends ASICs (application specific integrated circuits), PAL (programmable array logic), PLAs (programmable logic arrays), decoders, volatile and non-volatile memories, non-software based processors, or other circuitry, or digital computers including microprocessors and microcomputers of any architecture, or combinations thereof. Words of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware. Process diagrams are also representative of flow diagrams for microcoded and software based embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication system comprising:
    a transmitter for broadcasting communication signals having an information content, comprised of a standard broadcast format in addition to an associated icon string, said associated icon string being transmitted with the communication signal;
    a receiver for receiving and processing said communication signals, said receiver comprising:
        circuitry for processing said standard broadcast format portion of said communication signals in preparation for a display of said signals,
        circuitry for stripping said associated icon string comprised of both close caption text and other icons that are imbedded in the close caption text and marked with special characters from said communication signal,
        decoding/processing circuitry for decoding and processing of said other icons, and
        at least one display for the simultaneous display of said standard broadcast format and said other icons, wherein said other icons displayed is the source information such as a network identifier or station call letters or a program title, or other information about the communication signal.

2. The communications system of claim 1, further comprising:
    function specific memory circuits connected to an output of said decoding/processing circuitry for storage of said other icons;
    an interface connected to an input of said decoding/processing circuitry; and
    remote circuitry for controlling accessing and displaying of said other icons, from said function specific memory circuits, through said decoding/processing circuitry, onto a display.

3. The communications system of claim 2, wherein said other icon contains program or network specific information.

4. The communications system of claim 1, wherein said transmitter is a television broadcast station which broadcasts at least one program and said receiver is a television set.

5. The communications system of claim 1, wherein said communication signal is transmitted by standard airborne broadcast.

6. The communications system of claim 1, wherein said communication signal is transmitted by cable.

7. The communications system of claim 1, wherein said communication signal is transmitted by fiber-optic cable.

8. The communications system of claim 1, wherein said associated icon string is transmitted periodically with the communication signal.

9. The communications system of claim 1, wherein said at least one display is a television screen.

10. The communications system of claim 1, wherein said at least one display is not a part of a television screen.

11. The communications system of claim 1, wherein said other icons comprise at least one of the following: a broadcast station call letter, a title of a program being broadcast, a score of a game being broadcast, and a program itinerary.

12. The communications system of claim 1, wherein said at least one display of said communication signals and said other icon is specified by said remote circuitry, a serial or parallel interface, or said processing circuitry.

13. The communications system of claim 1, wherein said simultaneous display is the superimposition of said other icon on said display.

14. A communication system comprising:
a transmitter for broadcasting communication signals having an information content, comprised of a standard broadcast format in addition to an associated icon string;
a receiver for receiving and processing said communication signals, said receiver comprising:
circuitry for processing said standard broadcast format portion of said communication signals in preparation for a display of said signals,
circuitry for stripping said associated icon string comprised of both close caption text and other icons that are imbedded in the close caption text and marked with special characters from said communication signal,
decoding/processing circuitry for decoding and processing of said other icons,
at least one display for the simultaneous display of said standard broadcast format and said other icons,
function specific memory circuits connected to an output of said decoding/processing circuitry for storage of said other icons post separation of said other icons into function specific icons;
an interface connected to an input of said decoding/processing circuitry;
remote circuitry for controlling accessing and displaying of said other icons, from said function specific memory circuits, through said decoding/processing circuitry, onto said simultaneous display.

15. The communications system of claim 14, further comprising several displays, one of which displays a program being broadcast, and each of said other display, displaying one said function specific icon simultaneously with said display of said program.

16. The communications system of claim 14, wherein said other icon may be accessed through the decoder/processor automatically upon a station being changed.

17. A communication system comprising:
a transmitter for broadcasting communication signals having an information content, comprised of a standard broadcast format in addition to an associated icon string;
a receiver for receiving and processing said communication signals, said receiver comprising:
circuitry for processing said standard broadcast format portion of said communication signals in preparation for a display of said signals,
circuitry for stripping said associated icon string comprised of both close caption text and other icons imbedded in the close caption text and marked with special characters from said communication signal,
decoding/processing circuitry for decoding and processing of said other icons, and
at least one display for the simultaneous display of said standard broadcast format and said other icons,
function specific memory circuits connected to the output of said decoding/processing circuitry for the storage of said other icons post separation of said other icons into function specific icons,
an interface connected to an input of said decoding/processing circuitry,
remote circuitry for controlling accessing and displaying of said other icons, from said function specific memory circuits, through said decoding/processing circuitry, onto said simultaneous display, and
wherein at least one of said function specific memories is non-volatile for non-volatile storage of program information once during any given program.

18. The communications system of claim 17, wherein channel call letters and network source information are downloaded to said non-volatile function specific memory, via said interface, from a data base of a separate computer.

19. A communication system comprising:
a transmitter for broadcasting communication signals having an information content, comprised of a standard broadcast format in addition to an associated icon string;
a receiver for receiving and processing said communication signals, said receiver comprising:
circuitry for processing said standard broadcast format portion of said communication signals in preparation for a display of said signals,
circuitry for stripping said associated icon string comprised of both close caption text and other icons imbedded in the close caption text and marked with special characters from said communication signal,
decoding/processing circuitry for decoding and processing of said other icons, and
at least one display for the simultaneous display of said standard broadcast format and said other icons, and
wherein said other icon to be displayed is the source information, which is determined from frequencies of said communication source signals.

20. The communications system of claim 19, wherein said communication source signals are commercial radio broadcast frequencies and said other icon is displayed on a alphanumeric display.

21. A receiver, comprising:
circuitry for receiving communication signals;
circuitry for processing a standard broadcast format portion of said communication signals in preparation for a display of said signals;
circuitry for stripping an associated icon string comprised of both close caption text and other icons that are imbedded in the close caption text and marked with special characters from said communication signals; and
decoding/processing circuitry for decoding and processing of said other icons.

22. The receiver of claim 21, further including at least one display for the simultaneous display of said standard broadcast format and said other icons.

23. The receiver of claim 21, wherein said other icons comprise source information such as a network identifier or station call letters or a program title, or other information about the communication signal.

24. The receiver of claim 22, wherein said other icons comprise source information, which is determined from frequencies of said communication source signals.

25. The receiver of claim 22, wherein said other icons comprise source information such as a network identifier or station call letters or a program title, or other information about the communication signal.

26. The receiver of claim 21, further comprising:
   function specific memory circuits connected to an output of said decoding/processing circuitry for storage of said other icons post separation of said other icons into function specific icons;
   an interface connected to an input of said decoding/processing circuitry; and
   remote circuitry for controlling accessing and displaying of said other icons, from said function specific memory circuits, through said decoding/processing circuitry, onto a display.

27. The receiver of claim 22, further comprising:
   function specific memory circuits connected to an output of said decoding/processing circuitry for storage of said other icons post separation of said other icons into function specific icons;
   an interface connected to an input of said decoding/processing circuitry; and
   remote circuitry for controlling accessing and displaying of said other icons, from said function specific memory circuits, through said decoding/processing circuitry, onto said display.

28. The receiver of claim 26, wherein at least one of said function specific memories is non-volatile for non-volatile storage of program information once during any given program.

29. The receiver of claim 27, wherein at least one of said function specific memories is non-volatile for non-volatile storage of program information once during any given program.

30. The receiver of claim 22, wherein said receiver is a television set.

31. The receiver of claim 21, wherein said communication signals are received via standard airborne broadcast.

32. The receiver of claim 21, wherein said communication signals are received via cable.

33. The receiver of claim 21, wherein said communication signals are received via fiber-optic cable.

34. The receiver of claim 22, wherein said at least one display is a television screen.

35. The receiver of claim 22, wherein said at least one display is not a part of a television screen.

36. The receiver of claim 21, wherein said other icons comprise at least one of the following: a broadcast station call letter, a title of a program being broadcast, a score of a game being broadcast, and a program itinerary.

37. The receiver of claim 27, further comprising several display, one of which display a program being broadcast, and each of said other display, displaying one of said function specific icon simultaneously with said display of said program.

38. The receiver of claim 27, wherein said other icon may be accessed through the decoder/processor automatically upon a station being changed.

39. The receiver of claim 21, wherein said other icons contain program or network specific information.

40. The receiver of claim 22, wherein said at least one display of said communication signals and said other icons are specified by remote circuitry, a serial or parallel interface, or said processing circuitry.

41. The receiver of claim 29, wherein channel call letters and network source information are down loaded to said non-volatile function specific memory, via said interface, from a data base of a separate computer.

42. The receiver of claim 24, wherein said communication source signals are commercial radio broadcast frequencies and said other icon is displayed on an alphanumeric display.

43. The receiver of claim 22, wherein said simultaneous display is the superimposition of said other icon on said communication signal display.

\* \* \* \* \*